United States Patent [19]

Miyakoshi et al.

[11] 4,433,850
[45] Feb. 28, 1984

[54] FRONT WHEEL SUSPENSION SYSTEM FOR MOTORCYCLES

[75] Inventors: Shinichi Miyakoshi, Saitama; Tokio Isono, Tokyo, both of Japan

[73] Assignee: Honda Giken Kogyo Kabushiki Kaisha, Tokyo, Japan

[21] Appl. No.: 356,362

[22] Filed: Mar. 9, 1982

[30] Foreign Application Priority Data

Mar. 10, 1981 [JP] Japan .................................. 56-34421
Mar. 20, 1981 [JP] Japan .................................. 56-40753

[51] Int. Cl.³ .............................................. B62K 25/12
[52] U.S. Cl. ..................... 280/277; 180/219; 267/11 A; 280/5 H; 280/279; 280/283; 280/286
[58] Field of Search ............. 280/277, 274, 275, 276, 280/278, 279, 280, 281 R, 285, 6.11; 267/11 A, 12, 13

[56] References Cited

U.S. PATENT DOCUMENTS

| | | | |
|---|---|---|---|
| 2,913,255 | 11/1959 | Courtney et al. | 280/277 |
| 4,186,936 | 2/1980 | Offenstadt et al. | 280/277 |
| 4,212,481 | 7/1980 | Ribi | 280/279 X |

*Primary Examiner*—Joseph F. Peters, Jr.
*Assistant Examiner*—Mitchell J. Hill
*Attorney, Agent, or Firm*—Irving M. Weiner; Pamela S. Burt; John L. Shortley

[57] ABSTRACT

A link type front wheel suspension system comprising an upper fork, a lower fork, links connecting between the upper fork and the lower fork, a shock absorber for a front wheel, and a transmission system for transmitting a load received by the front wheel to the shock absorber through the lower fork and the connecting links. The shock absorber of the suspension system is supported by a vehicle body frame and the transmission of load to the shock absorber is performed through a fluid circuit, whereby reduction in weight of the system and reduction in the moment of inertia in the steering operation is attained.

18 Claims, 16 Drawing Figures

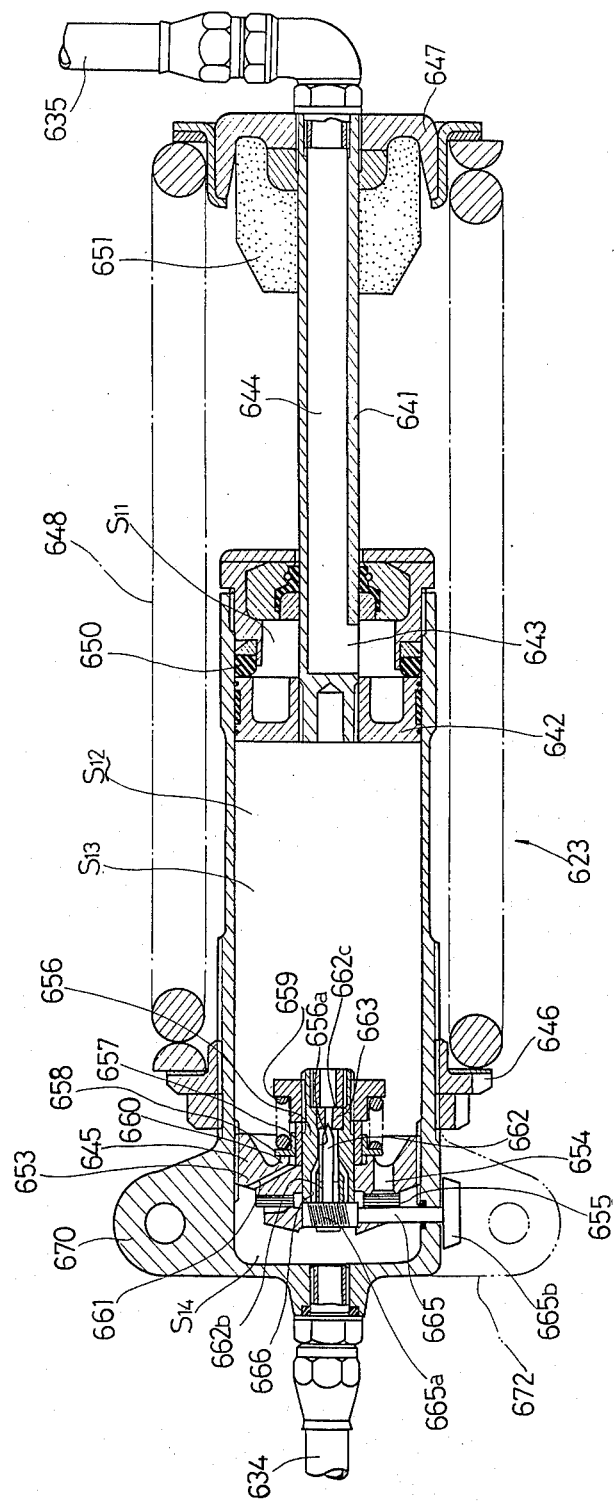

FRONT WHEEL SUSPENSION SYSTEM FOR MOTORCYCLES

BACKGROUND OF THE INVENTION

1. Field of the Invention

The present invention relates to an improved front wheel suspension system, and particularly a link motion type front wheel suspension system, for motorcycles.

2. Description of Relevant Art

A substantially new type of front wheel suspension system for motorcycles, which employs a link motion structure for suspending the front wheel rather than a pair of bottom cases and a forked pipe as employed in a telescopic type suspension system, is already well known from U.S. Pat. No. 4,212,481 issued on July 15, 1980 to Valentino Ribi. In such known suspension system, a shock absorber is provided for each of a pair of link motion structures mounted on respective sides of the front wheel.

An exemplary improvement of the link motion type front wheel suspension system for motorcycles has been proposed in U.S. Pat. No. 4,406,475 issued Sept. 27, 1983, wherein a shock absorber is mounted between a pair of link motion structures disposed on the right and left sides of the front wheel in front of a head pipe. With such arrangement, the number of shock absorbers can be reduced to one, whereby reduction in both the weight of the front wheel suspension system and the moment of inertia caused by the steering action of the front wheel can be attained.

However, the single shock absorber provided in such previously-proposed front wheel suspension system has a relatively large weight which is disadvantageous.

In order to overcome such disadvantage, the present invention provides a further improvement of such type of front wheel suspension system.

SUMMARY OF THE INVENTION

The present invention provides a front wheel suspension system for motorcycles comprising a vehicle body frame, an upper fork supported by the vehicle body frame, a lower fork which supports a front wheel, links connecting between the upper fork and the lower fork, a shock absorber, and transmission system means for transmitting to the shock absorber a load applied from the front wheel to the lower fork and the links, with the shock absorber being fixed to the vehicle body frame. The load transmission system for the shock absorber includes a pressure fluid circuit whereby the shock absorber is operated through a fluid pressure.

It is an object of the present invention to provide a front wheel suspension system for motorcycles having a reduced weight and a reduced moment of inertia in steering operation in comparison with previously known constructions.

It is another object of the present invention to provide a front wheel suspension system for motorcycles which not only attains the aforesaid object, but which also avoids undue limitation on the mounting position of a shock absorber.

It is a further object of the present invention to provide a front wheel suspension system for motorcycles wherein a load transmission system for a shock absorber is as simplified as possible in construction.

A still further object of the present invention is to provide a front wheel suspension system for motorcycles wherein the mounting structure for a shock absorber is simplified.

The above and further objects, details and advantages of the present invention will become apparent from the following detailed description of various preferred embodiments of the invention, when read in conjunction with the accompanying drawings.

BRIEF DESCRIPTION OF THE DRAWINGS

FIG. 11 is a sectional side view showing a construction of the shock absorber illustrated in FIG. 10.

DETAILED DESCRIPTION OF PREFERRED EMBODIMENTS

Figure 1:
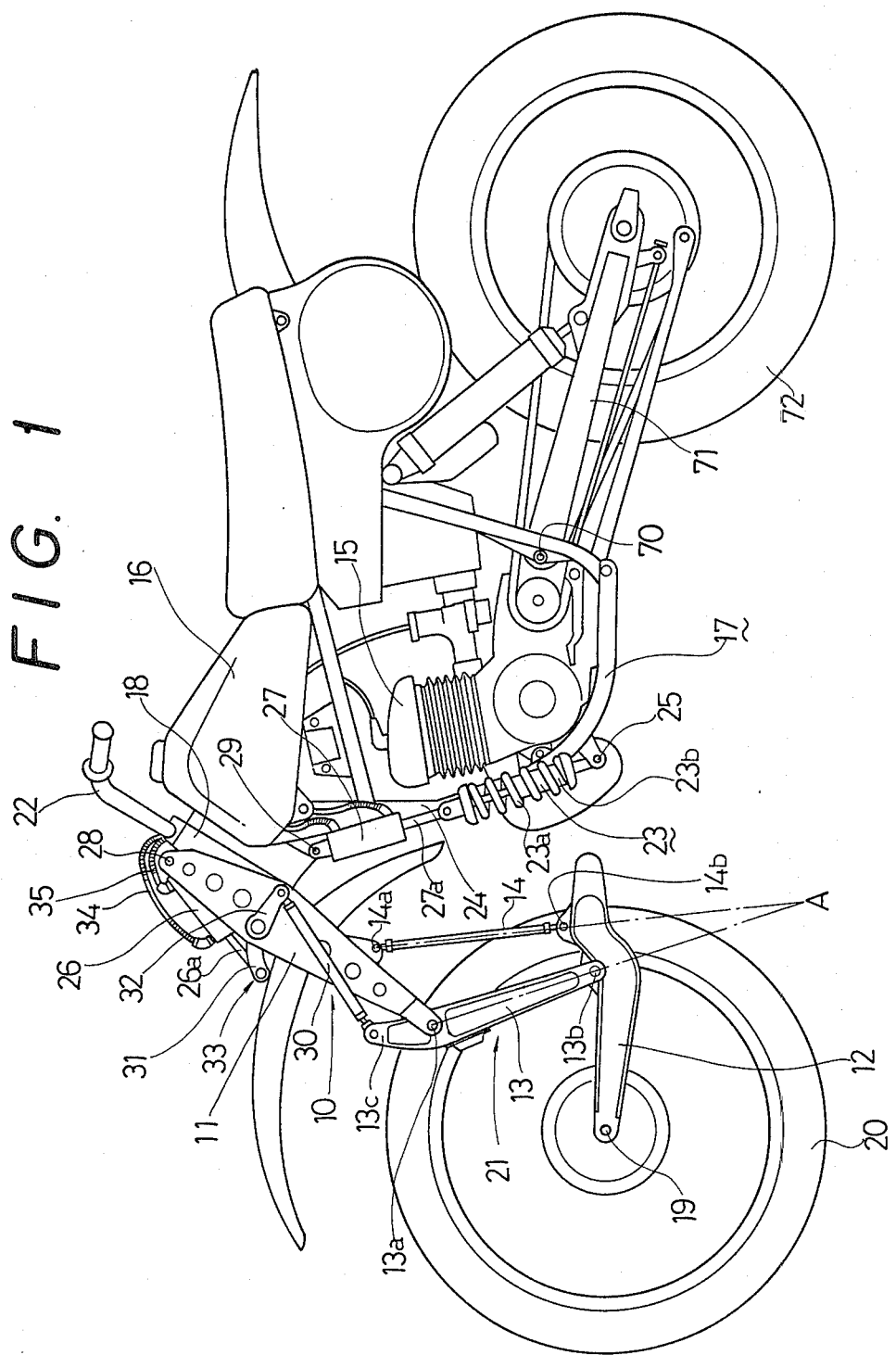
FIG. 1 is an overall side view of a motorcycle provided with a front wheel suspension system in accordance with a first embodiment of the present invention.

With reference to FIG. 1, which is an overall side view of a motorcycle to which the present invention is applied, there is shown a front wheel suspension system 10 comprising an upper fork 11 and a lower fork 12 connected together through two front and rear arms 13 and 14, respectively. The upper fork 11 is pivoted, rotatably to the right and left, to a head pipe 18 at a front end of a vehicle body 17 on which is mounted an engine 15 and a fuel tank 16. A front wheel axle 19 is transversely fitted in a front end of the lower fork 12, and a front wheel 20 is supported by the lower fork 12. The connection between the upper fork 11, the lower fork 12 and the arms 13, 14 is effected through pivot shafts 13a, 14a, 13b and 14b, so that the front wheel suspension system 10 is constructed as a link motion structure 21 having a substantially quadrilateral configuration as viewed from the side thereof, wherein the upper fork 11 serves as a fixed link while the lower fork 12 and the arms 13, 14 serve as movable links. By operating a handlebar 22 attached to the upper fork 11, the front wheel suspension system 10 can be steered to the right and left about the head pipe 18.

Vertical movements of the front wheel 20 in following irregularities in the road surface are accommodated by deforming operations of the link motion structure 21 based on pivotal movements of the arms 13 and 14 around the shafts 13a and 14a, respectively. When the structure is arranged such that imaginary axial lines extending from the arms 13 and 14 converge and cross each other at a rearwardly descended point A, the lower fork 12 pivots with such position-changing point A comprising a monmentary center, whereby the vertical locus of the front wheel axle 19 can be made an approximately rectilinear locus substantially parallel to the axis in the handlebar turning operation.

The aforesaid vertical movement of the front wheel 20 is absorbed and cushioned by an expanding and retracting operation of a single shock absorber 23. The shock absorber 23 comprises a spring 23a and a damper 23b. The damper 23b may be of a gas pressure type or a liquid pressure type, or a mixed gas-liquid type may be employed. The lower end of the shock absorber 23 is pivoted through a pivot shaft 25 to a down tube 24 which comprises a portion of the vehicle body 17, and thus the shock absorber 23 is attached to the vehicle body 17. Thus, even when the shock absorber 23 is very heavy, the weight of the front wheel suspension system 10 is not increased and can be kept to a minimum, while at the same time the moment of inertia around the head pipe 18 necessary for the steering operation is effectively reduced.

The link motion structure 21, which permits the movement of the front wheel 20 by deformations, and the shock absorber 23 are connected together through a load transmission system which comprises a rod 30, rocker arms 31 and 32, first and second cylinders 26 and 27, and connecting pipes 34 and 35. The first cylinder 26 is connected at the upper end thereof to an upper end portion of the upper fork 11 through a shaft 28, while the second cylinder 27 is connected at the upper end thereof to the down tube 24 through a shaft 29. Thus, even if the first cylinder 26 is attached to the upper fork 11 at the front wheel suspension system 10 side, the weight of the front wheel suspension system 10 and the moment of inertia are not substantially influenced because the cylinder 26 is lighter in weight than the shock absorber 23.

At either one of the two front and rear arms 13 and 14, i.e., at the front arm 13 in this embodiment, there is formed a tip portion 13c which extends upwardly beyond the connection of the arm 13 with the upper fork 11 through the shaft 13a, and the lower end of the rod 30 is connected to the tip portion 13c. A piston rod 26a of the first cylinder 26 and the upper end of the rod 30 are connected through lever means 33 which is defined by connecting the opposed base ends of the two rocker arms 31 and 32 extending in the front and rear. Thus, the link motion structure 21 and the first cylinder 26 are connected by a mechanical transmission system or linkage includimg the rod 30 and the lever means 33. The first cylinder 26 and the second cylinder 27 are connected through flexible pipes 34 and 35 in which there flows a pressure medium such as a pressure oil, i.e., through a pressure fluid circuit, and a piston rod 27a of the second cylinder 27 and the upper end of the shock absorber 23 are connected.

When the front wheel 20 moves upwardly, the rod 30 is forced downwardly by a downward tensile load and the lever means 33 is thereby pivoted in a clockwise direction, so that the first cylinder 26 is compressed and the pressure medium expelled from the first cylinder 26 enters the second cylinder 27. Consequently, the pressure of the pressure medium acting on the second cylinder 27 causes the piston rod 27a to extend, so that the shock absorber 23 is ompressed by the piston rod 27a and generates a shock absorbing force to accommodate the vertical movement of the front wheel 20 and the deformation of the link motion structure 21. Thus, in the present invention the mechanical operation of the link motion structure 21 is converted to the pressure of the pressure medium by the first cylinder 26 and this pressure acts on the shock absorber 23 through the second cylinder 27. In this case, the second cylinder 27 functions to convert the pressure generated in the first cylinder 25 into a mechanical momentum and to exert it on the shock absorber 23.

When the front wheel 20 moves downwardly, the foregoing operation is reversed, and the front wheel 20 moves downwardly under the action of a shock absorbing force of the shock absorber 23.

Figure 2:
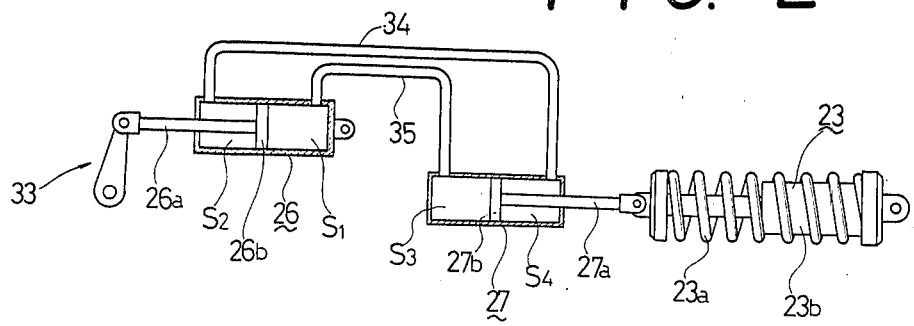
FIG. 2 schematically illustrates a principal part of a shock absorber and a load transmission system for the shock absorber.

FIG. 2 illustrates the hereinabove described load transmission system from the lever means 33 to the shock absorber 23, in which chambers $S_1$, $S_2$, $S_3$ and $S_4$ of the first and second cylinders 26, 27 defined by the pistons 26b first and second cylinders 26, 27 defined by the pistons 26b and 27b are filled with a non-compressive pressure medium such as oil, the chambers $S_1$ and $S_3$ and the chambers $S_2$ and $S_4$ being connected through the pipes 35 and 34, respectively. With such arrangement, both upward and downward movements of the front wheel are converted to the pressure of the medium filled in the first and second cylinders 26, 27, and this pressure acts on the shock absorber 23.

Figure 3:
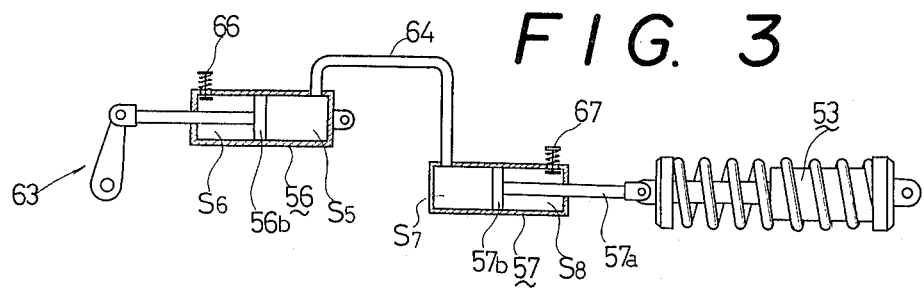
FIG. 3 is a view similar to FIG. 2, showing a principal part of a load transmission system according to a second embodiment of the invention.

Referring now to FIG. 3, there is shown a load transmission system according to a second embodiment of the invention, in which chambers $S_5$, $S_6$ and $S_7$, $S_8$ are defined by pistons 56b and 57b of first and second cylinders 56, 57, respectively. The chambers $S_5$ and $S_7$ are filled wth a non-compressive pressure medium such as oil, with the chambers $S_5$ and $S_7$ being connected through a pipe 64. The other chambers $S_6$ and $S_8$ are either filled with a compressive pressure medium such as gas or are permitted to communicate with the outside air. As lever means 63 pivots in a clockwise direction along with an upward movement of the front wheel, the piston rod 57a is extended by the pressure of the non-compressive medium, thus causing a shock absorber 53 to be compressed and generate a shock absorbing force. In this case, if gas or the like is sealed in the chambers $S_6$ and $S_8$, the pressure of the gas as a compressive medium is increased due to a pivotal movement of the lever means 63 along wth movement of the front wheel, so that the shock absorbing force against the movement of the front wheel becomes equal to the shock absorbing force of the shock absorber 53 itself plus the pressure of this compressive medium, whereby the shock absorbing force for the front wheel comprises a force having a gradually increasing progressive characteristic. If the chambers $S_6$ and $S_8$ are permitted to communicate with the outside air and valves 66 and 67 are mounted to the chambers $S_6$ and $S_8$, respectively, the shock absorbing force for the front wheel also comprises a force having a progressive characteristic. In this case, the progressive characteristic can be changed by changing the opening adjusting operation of the valve means 66 and 67.

Figure 4:
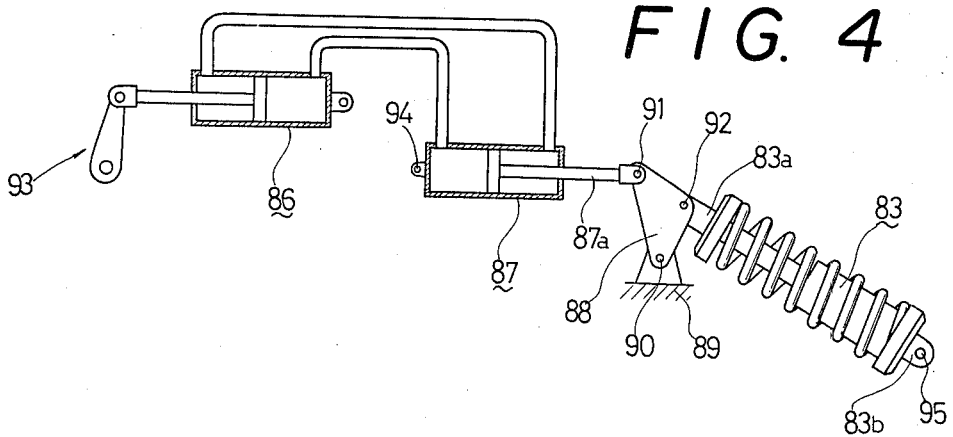
FIG. 4 is a view similar to FIG. 2, showing a principal part of a load transmission system according to a third embodiment of the invention.

Referring now to FIG. 4, there is shown a third embodiment of the invention, wherein a modification is made with respet to the connecting structure between a second cylinder 87 and a shock absorber 83, the connecting structure between a first cylinder 86 and the second cylinder 87 being the same as described with reference to FIG. 2. Interposed between the second cylinder 87 and the shock absorber 83 is a pivotal member 88 serving as a conneting link, the pivotal member 88 having a substantially triangular configuration as viewed from the side thereof and being pivotably fixed at the lower corner portion thereof to a vehicle body portion 89 through a shaft 90. A piston rod 87a of the second cylinder 87 and one end 83a of the shock absorber 83 are connected to an upper corner portion and a rear corner portion of the pivotal member 88, respectively, through shafts 91 and 92. The second cylinder 87 and the other end 83b of the shock absorber 83 are rockably attached to the vehicle body through shafts 94 and 95.

By using the pivotal member 88 having the function of a bell crank in the present embodiment, the connecting angle between the mechanically connected second cylinder 87 and shock absorber 83 can be set at any desired value, and thus freedom of selection of the mounting position of the second cylinder 87 and the shock absorber 83 with respect to the vehicle body is improved. As a result of an extending action of the piston rod 87a of the second cylinder 87 along with a pivotal movement in a clockwise direction of lever means 92, the shock absorber 83 is compressed through the pivotal member 88. In this case, by suitably selecting the shape of the pivotal member 88, the allowable amount of compression of the shock absorber 83 can be increased in a ration larger than the moving stroke of the front wheel, and thus the shock absorbing force of the shock absorber 83 can be made to have a progressive characterictic.

FIGS. 5 through 9 show mounting positions of first and second cylinders and a shock absorber according to further embodiments of the invention.

Figure 5:
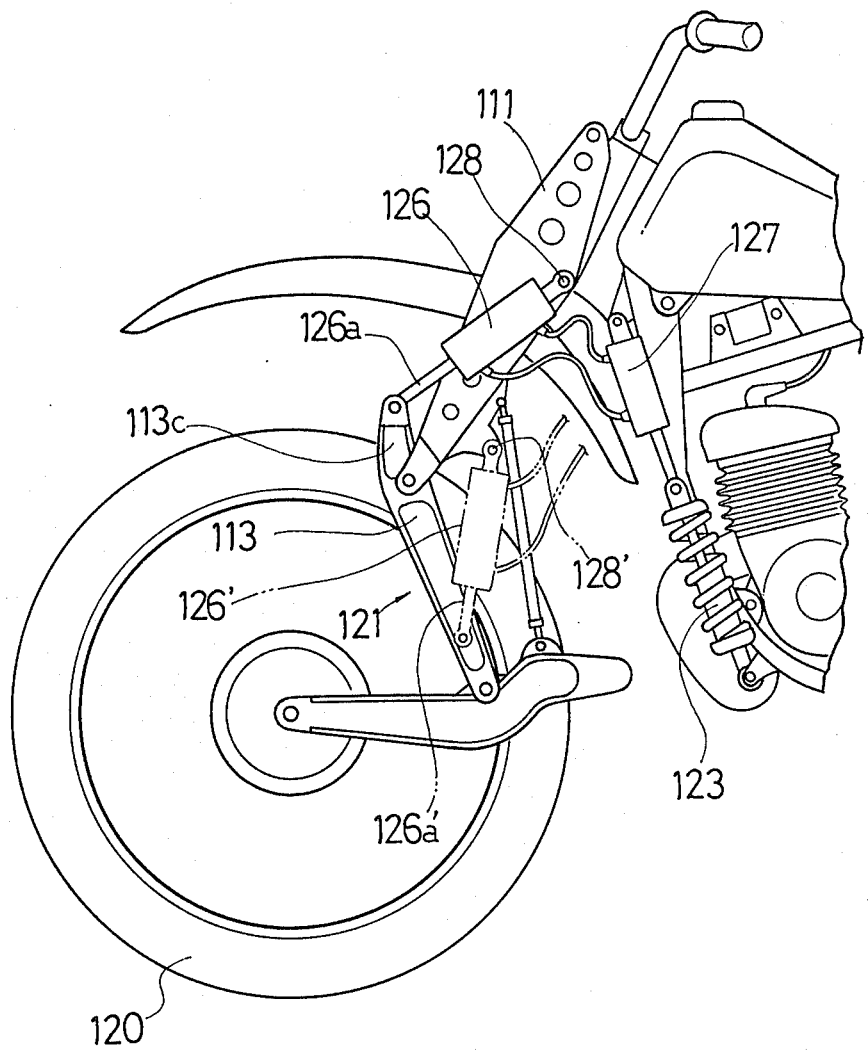
FIGS. 5 through 9 are partially sectional views of a motorcycle, respectively showing various different mounting positions of a shock absorber.

In the fourth embodiment shown in FIG. 5, the mounting positions of a second cylinder 127 and a shock absorber 123 are the same as described wth reference to FIG. 1, while the mounting positions of first cylinders 126 and 126' are changed. The first cylinder 126 is disposed at a side of an upper fork 111 and the upper end thereof is connected to the upper fork through a shaft 128, while a piston rod 126a is connected to a tip portion 113c of an arm 113 which comprises a link motion structure 121 having a substantially quadrilateral configuration as viewed from the side thereof. Thus, in this embodiment, the first cylinder 126 is connected to movable links of the link motion structure 121 directly, without using a rod and lever means. With regard to a first cylinder 126' shown in chain line, the upper end thereof is connected to the upper fork 111 through a shaft 128' and a piston rod 126a' is connected to the arm 113. Also in this arrangement, the first cylinder 126' can be connected directly to movable links of the link motion structure 121. The first cylinders 126 and 126' may be provided for each of the link motion structures 121 which are mounted on both sides of a front wheel 120, or may be provided for only one side link motion structure.

When the link motion structure 121 is deformed by an upward movement of the front wheel 120 and the first cylinders 126 and 126' deliver a pressure medium to the second cylinder 127 to exert the pressure of the pressure medium upon the shock absorber 123, the first cylinder 126 delivers the pressure medium along with an extending action of the piston rod 126a, while the first cylinder 126' delivers the pressure medium along with retractive action of the piston rod 126a'.

Figure 6:
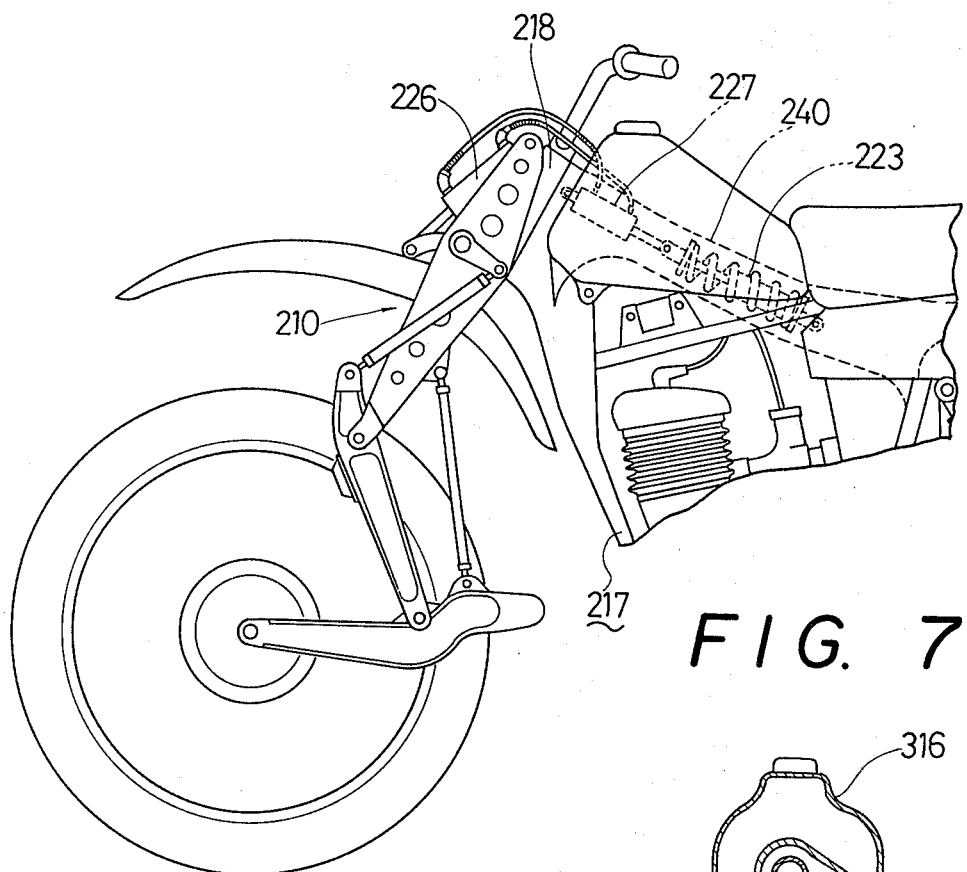

In the fifth embodiment shown in FIG. 6, the mounting position of a first cylinder 226 is the same as described with reference to FIG. 1, while the mounting positions of a second cylinder 227 and a shock absorber 223 are modified. A main frame 240 of a vehicle body 217 extending backwardly from a head pipe 218 which serves as a central steering shaft of a front wheel suspension system 210, is formed of a pipe or channel material of a relatively large diameter, and the second cylinder 227 and the shock absorber 223 are disposed within the main frame 240. This arrangement is advantageous in that the second cylinder 227 and the shock absorber 223 can be arranged so as to utilize dead space in the vehicle body.

Figure 7:
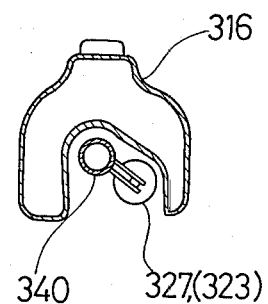

In the sixth embodiment shown in FIG. 7, a main frame 340 is of a relatively small diameter. A second cylinder 327 and a shock absorber 323 may be disposed below the main frame 340, or between the main frame 340 and a fuel tank 316 which spans the frame 340, and thus in this arrangement a dead space is also effectively utilized.

Figure 8:
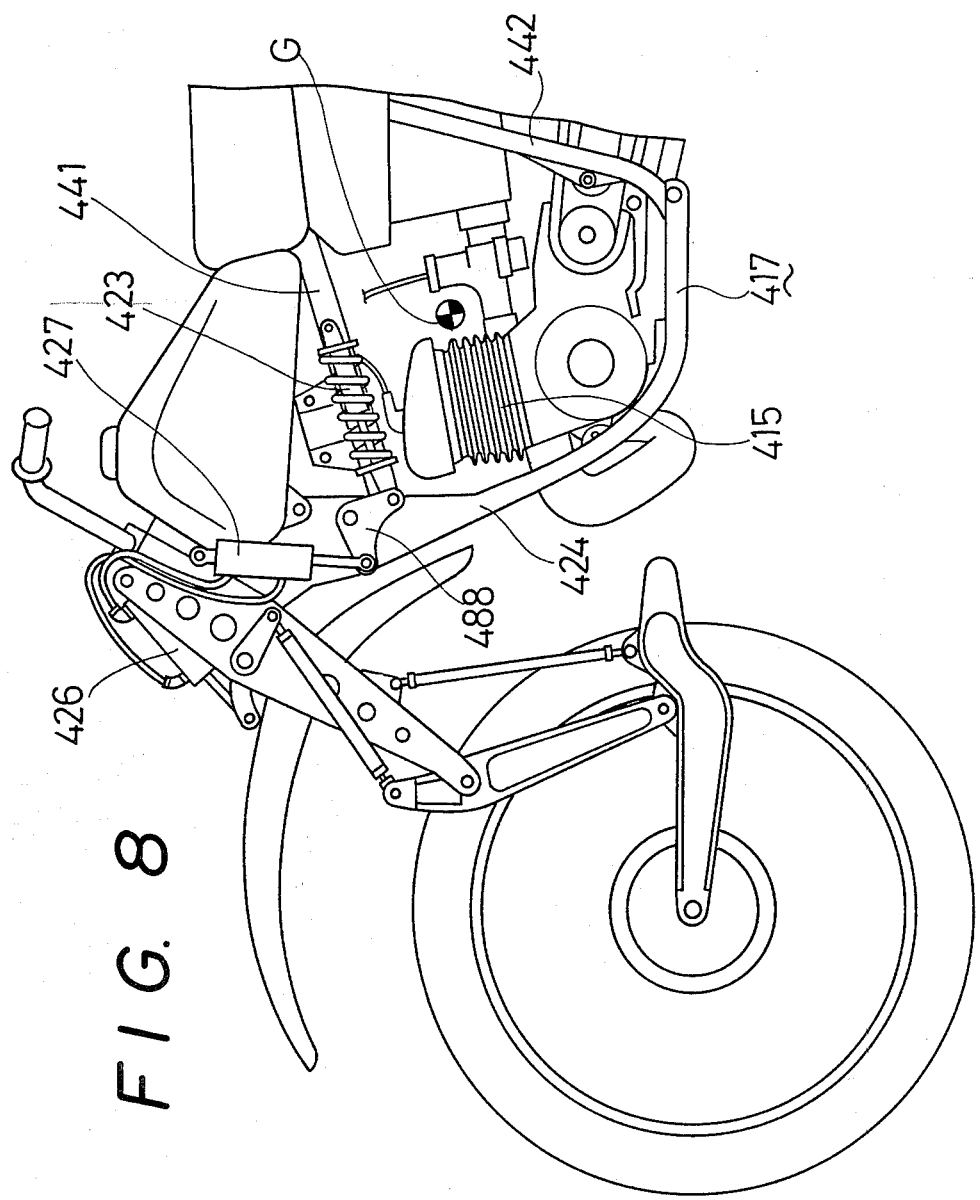
Figure 9:
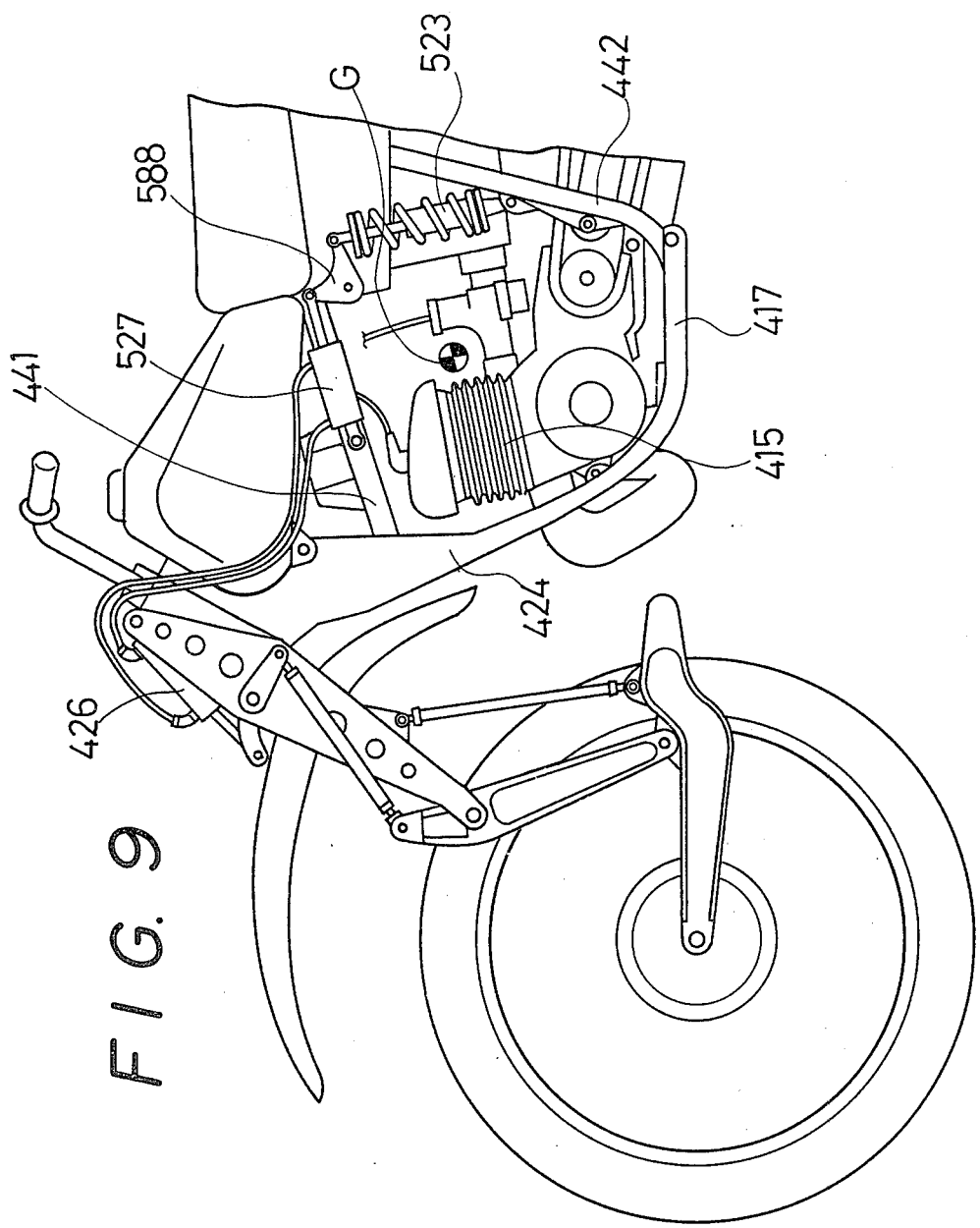

In the seventh and eighth embodiments shown in FIGS. 8 and 9, the mounting position of a first cylinder 426 is the same as described with reference to FIG. 1, and the mounting positions of second cylinders 427, 527 and shock absorbers 423, 523 are modified. As shown in FIG. 8, the second cylinder 427 is attached to an upper portion of a down tube 424 and the shock absorber 423 is attached to a stiffener frame 441 which extends backwardly from the down tube 424. The second cylinder 527 shown in FIG. 9 is attached to the stiffener frame 441 and the shock absorber 523 is attached to a rear frame 442 which extends upwardly from the rear end of the down tube 424. When the second cylinders 427, 527 and the shock absorbers 423, 523 are thus disposed at predetermined angles, pivotal members 488 and 588 are employed as described hereinabove with reference to FIG. 4.

With further regard to the seventh and eighth embodiments shown in FIGS. 8 and 9, the second cylinders and the shock absorbers are disposed around an engine 415 and can be brought close to the center of gravity G of the motorcycle because the center of gravity G exists near the engine 145. Thus, even if the second cylinder and the shock absorbers are attached to a vehicle body 417, the moment of inertia of the motorcycle around the center of gravity G can be minimized.

As will be understood from the foregoing, in accordance with the present invention, in a motorcycle having a link motion type front wheel suspension system wherein an upper fork and a lower fork are connected through two arms, a shock absorber for absorbing and cushioning the movement of the front wheel in following irregularities in the road surface is mounted on the vehicle body side around which the front wheel suspension system pivots to the right and left. This arrangement contributes to reduction in weight of the front wheel suspension system, and this reduction in weight in turn permits reduction in the moment of inertia of the front wheel suspension system about the steering shaft, and thus the functioning of a motorcycle having such a front wheel suspension system is significantly improved.

Figure 10:
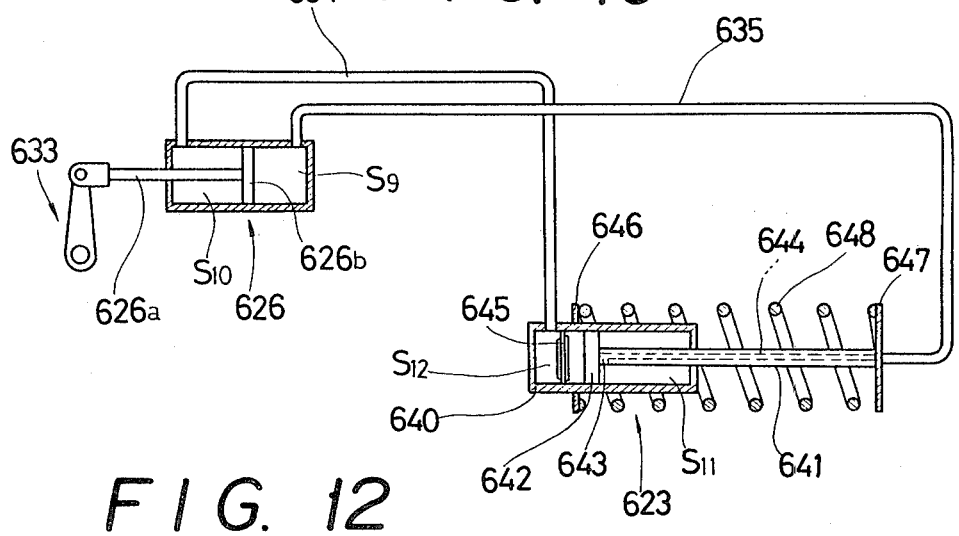
FIG. 10 schematically illustrates a principal part of a shock absorber and a load transmission system for the shock absorber according to a fourth embodiment of the invention.

With reference now to FIGS. 10 through 14, there is shown the structure of a shock absorber according to a ninth embodiment of the invention, wherein a second cylinder is eliminated from a load transmission system. In FIG. 10, a piston 642 joined to an inner end portion of a piston rod 641 is slidably disposed within a cylinder barrel 640 of a shock absorber 623 and the inside of the cylinder barrel 640 is partitioned by the piston 642 into two chambers $S_{11}$ and $S_{12}$. The inside of a cylinder 626 is partitioned by a piston 626b into first and second chambers $S_9$ and $S_{10}$, and the third and fourth chambers $S_{10}$ and $S_{12}$ are connected through a pipe 634. The piston rod 641 is formed of a hollow pipe material, and the outer end portion thereof and the chamber $S_9$ are connected through a pipe 635. In the inner end portion of the piston rod 641 there is formed a hole 643 which opens toward the chamber $S_{11}$, so that the chamber $S_9$ of the cylinder 626 and the chamber $S_{11}$ in the cylinder barrel 640 of the shock absorber 623 communicate with each other through the pipe 635, a first passage 644 formed within the piston rod 641, and the hole 643. Alternatively, the chambers $S_9$ and $S_{11}$ may be brought into direct communication with each other by connecting the pipe 635 to the cylinder barrel 640.

Within the chamber $S_{12}$ of the cylinder barrel 640 there is disposed a damping force generating means 645 which restricts the flow of a pressure medium when the latter flows from right to left and from left to right in FIG. 10, thereby producing a damping force as a shock absorbing force. A non-compressive oil may be employed as the pressure medium, which oil is filled in the chambers $S_9$, $S_{10}$, $S_{11}$ and $S_{12}$. Spring shoe members 646 and 647 are fixed to the outer peripheral surface of the cylinder barrel 640 and to the outer end of the piston rod 641, respectively, and a spring 648 is arranged between members 646 and 647.

When lever means 633 pivots to the right in FIG. 10 along with an upward movement of the front wheel 20, the pressure medium in the chamber $S_9$ of the cylinder 626 is extruded by the first piston 626b and is fed into the chamber $S_{11}$ of the shock absorber 623, allowing the pressure of the pressure medium to act on the second piston defined by piston 642 of the shock absorber 623. Therefore, the mechanical momentum of the link motion structure 21 and the lever means 633 caused by the movement of the front wheel 20 is converted to the pressure of the pressure medium and this pressure acts on the shock absorber 623. By the pressure of the pressure medium the piston 642 slides to the left in FIG. 10, while compressing the spring 648, and the pressure medium within the chamber $S_{12}$ is extruded into the chamber $S_{10}$ of the cylinder 626 by the extruding action of the piston 642. At this time the pressure medium passes through the damping force generating means 645, so that the flow rate of the pressure medium is throttled and restricted by the means 645. A damping force including the load required to compress the spring 648 is thus generated, and this damping force serves as a shock absorbing force against the upward movement of the front wheel 20.

With such construction, wherein only one cylinder 626 is included in the load transmission system from the arm 13 as a rocking member to the shock absorber 623, a shock absorbing force can be generated in the shock absorber 623. In this embodiment, therefore, the shock absorber 623 per se has a second fluid pressure cylinder structure which also performs the function of the second cylinder which was required in the embodiments of FIGS. 1 through 9. Further, the piston 642 of the shock absorber 623 is slidable directly by the pressure medium fed from the cylinder 626. As a result, there need be provided only one cylinder, thus decreasing the number of component parts and simplifying the load transmission system, as well as decreasing the weight of the shock absorbing means.

Moreover, in a shock absorber of the type wherein the sliding motion of a piston is effected by an external force, a load equal to such external force is exerted on the portion where the shock absorber is attached to the vehicle body, and therefore it is necessary that the shock absorber mounting portion be made sufficiently strong to resist such load. In this embodiment, however, the piston 642 slides by virtue of the pressure of the pressure medium entering the chamber $S_{11}$ of the shock absorber 623, so that the pressure of the pressure medium acting on the shock absorber 623 and the biasing force of the spring 648 offset each other in two opposite directions, such as, for example, in the axial direction of the shock absorber 623. Consequently, it is not necessary to enhance the mounting strength of the shock absorber 623 with respect to the vehicle body 17, and thus the mounting structure of the shock absorber can be simplified.

When the front wheel 20 moves downwardly, the pressure medium within the chamber $S_{10}$ of the cylinder 626 is fed to the chamber $S_{12}$ of the shock absorber 623, and the piston 642 of the shock absorber 623 slides to the right in FIG. 10 by virtue of the pressure of the pressure medium and the resilient force of the spring 648. Also, the pressure medium in the chamber $S_{12}$ passes through the damping force generating means 645, so that the front wheel 20 moves downwardly under the shock absorbing force of the shock absorber 623.

With reference now to FIG. 11, there is shown a construction of the shock absorber 623 having the above-described function. In such construction, a rebound rubber stop 650, with which the piston 642 comes into elastic abutment when the piston rod 641 reaches the limit of extension thereof, is disposed on the inside bottom portion of the cylinder barrel 640. Attached to the spring shoe member 647 is a rubber member 651 which comes into elastic abutment with the outside bottom portion of the cylinder barrel 640 when the piston rod 641 reaches the limit of retraction thereof.

A block 653 which comprises the body of the damping force generating means 645 is fixed in the chamber $S_{12}$ of the cylinder barrel 640, and with such block 653 the fourth chamber $S_{12}$ is further partitioned into the fifth and sixth chambers $S_{13}$ and $S_{14}$ respectively. In the block 653 there is axially formed a second passage 654 for communication between the chambers $S_{13}$ and $S_{14}$, and the end portion of the passage 654 on the chamber $S_{14}$ side is closed with a first valve member defined by a plurality of plate valves 655 having a flexible resilience, such as a leaf spring. A slide valve guide member 656 is inserted and fixed into the axial core portion of the block 653, and a second valve member defined by a slide valve 658 is slidably fitted through a tubular member 657 over the outer periphery of the end portion of the guide member 656 facing the chamber $S_{13}$. The valve 658, to which is imparted a resilient force of a spring 659, abuts an annular bank portion 660 formed on the bottom portion of the block 653, thereby closing the end portion on the chamber $S_{13}$ side of a third passage 661 which is formed in the block 653 for communication between the chambers $S_{13}$ and $S_{14}$.

Figure 13:
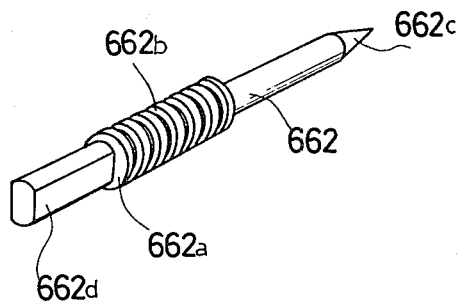
FIG. 13 is a perspective view of a needle included in the shock absorbing force adjusting means.

The guide member 656 is formed to be substantially hollow, and is provided with a through hole 656a in which is inserted a needle 662. The needle 662, as shown in FIG. 13, has external threads 662b formed on the larger-diameter portion 662a thereof, and by means of the external threads 662b the needle 662 is threadedly engaged with the guide member 656. A tapered tip portion 662c of the needle 662 is inserted in a tubular throttle member 663 which is fixed to the bottom portion of the guide member 656.

Figure 12:
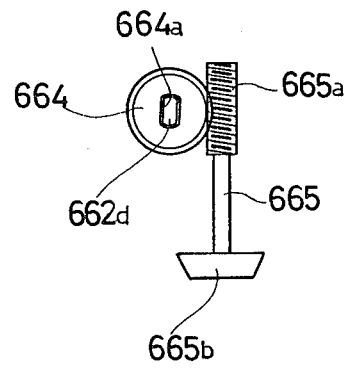
FIG. 12 is a plan view of a shock absorbing force adjusting means incorporated in the shock absorber of FIG. 11.

As shown in FIG. 12, the end portion of the needle 662 forms a chamfered, generally square shaft portion 662d, which is inserted in an aperture 664a formed in the axial core portion of a rotary disc 664, and a worm gear 665a is in engagement with the outer periphery of the rotary disc 664. The worm gear 665a is formed on an end portion of a shock absorbing force adjusting shaft 665, and the outer end of the shaft 665 projects from the cylinder barrel 640. The shaft 665 is rotated by operation of an operating portion 665b formed at the outer end of the shaft 665. In the guide member 656 there is formed a fourth passage 666 which opens toward the chamber $S_{14}$, and an end portion of the passage 666 faces the through hole 656a.

With an upward movement of the front wheel 20, as described hereinabove, the pressure medium is fed to the chamber $S_{11}$, and the consequent sliding motion of the piston 642 to the left increases the pressure of the pressure medium in the chamber $S_{13}$, and this pressure is exerted on the plate valves 655 through the passage 654. The plate valves 655 deflect according to the magnitude of pressure, and an amount of the pressure medium corresponding to the amount of deflection of the plate valves flows from the chamber $S_{13}$ to the chamber $S_{14}$. By such restriction of the flow rate with the plate valves 655, there is produced a shock absorbing force against the upward movement of the front wheel 20.

On the other hand, with a downward movement of the front wheel 20, the pressure medium is fed through the pipe 634 into the chamber $S_{14}$ and then flows through the passage 666, the through hole 656a and the tubular member 663 into the chamber $S_{13}$. In this case, the flow rate of the pressure medium is throttled by the opening area between the tapered tip portion 662c of the needle 662 and the tubular member 663 defining a third valve member, so that there is provided a shock absorbing force against the downward movement of the front wheel 20. If the adjusting shaft 665 is rotated by the operating portion 665b, this rotation is converted to the rotation of the needle 662 through the worm gear 665a and the rotary disc 664. As a result, the needle 662 moves in the axial direction by means of the external threads 662b thereof, so that the aforesaid opening area changes, thereby permitting adjustment of the shock absorbing force.

If the front wheel 20 moves downwardly into a depression in the road surface, allowing the total weight thereof to act on the load transmission path and the pressure of the chamber $S_{14}$ to increase to a great extent by the inflow of a large amount of pressure medium, this pressure acts on the slide valve 658 through the passage 661, so that the slide valve 658 opens against the bias of the spring 659. Thus, a large amount of pressure medium is allowed to flow form the chamber $S_{14}$ to the chamber $S_{13}$, thereby permitting a prompt downward movement of the front wheel 20 in following the irregularities of the road surface.

Figure 14:
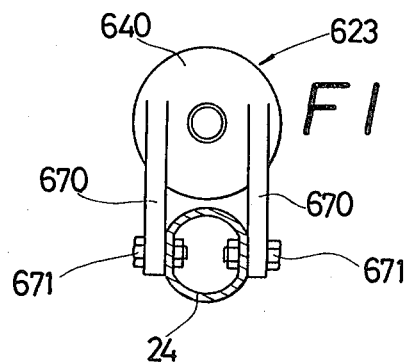
FIG. 14 illustrates a mounting arrangement of the shock absorber of FIG. 11.

A flange 670 is integrally formed at the top portion of the cylinder barrel 640, and when the shock absorber 623 is attached to the down tube of the vehicle body 17 as described above, the flange 670 is formed in a pair of parallel portions as shown in FIG. 14. The down tube 24 is held between the flanges 670 and the flanges are tightened with bolts 67. If the shock absorber 623 is mounted to another portion of the vehicle body 17, there is formed, in addition to the flange 670, a flange 672 (FIG. 11) at the top portion of the cylinder barrel 640, the flange 672 extending opposite to the flange 670.

Figure 15:
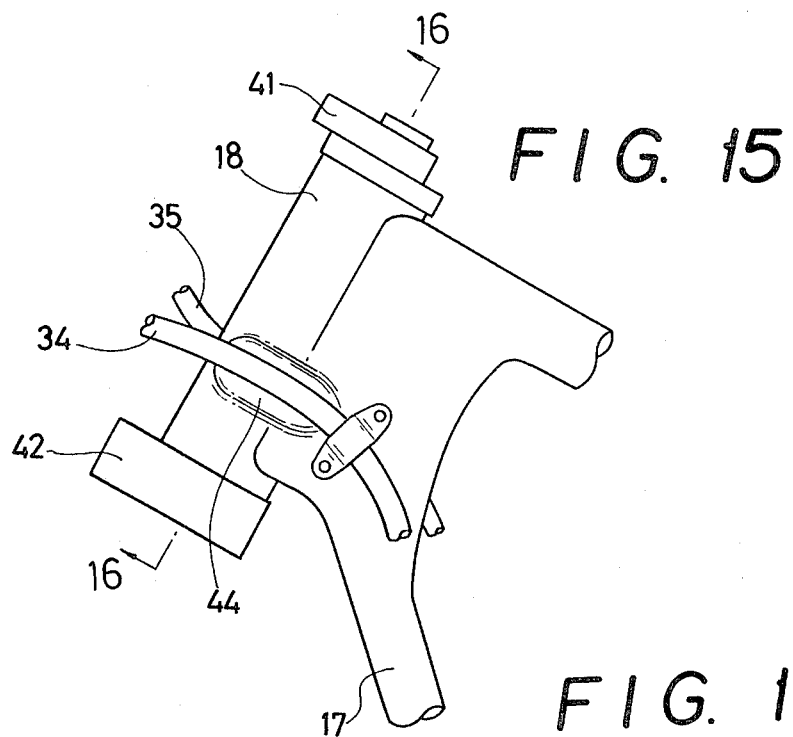
FIG. 15 is a side view of a head pipe portion of a load transmission system for a shock absorber in a front wheel suspension system of the invention, showing a piping structure of the head pipe portion.
Figure 16:
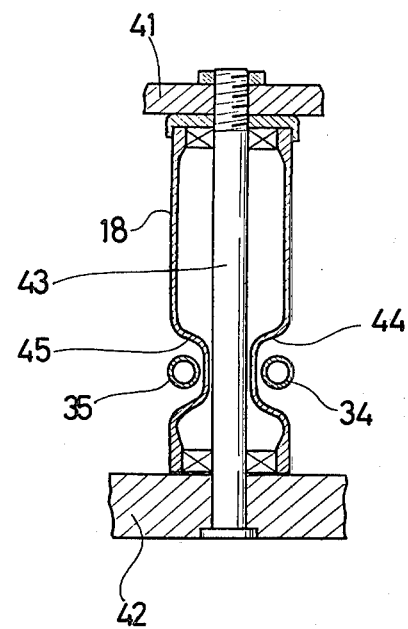
FIG. 16 is a sectional view taken along line 16—16 of FIG. 15.

In the embodiments described hereinabove, pipes are mounted between the first cylinder disposed on the front wheel suspension system side and the second cylinder or shock absorber disposed on the vehicle body side, such piping structure being shown in FIGS. 15 and 16.

At the top and bottom of the head pipe 18 fixed to the front end of the vehicle body 17 there is mounted a top bridge 41 and a bottom bridge 42, respectively. With the bridges 41 and 42, the right and left side members which comprise the upper fork are connected together. A stem shaft 43 is inserted rotatably into the head pipe 18, and extends between the bridges 41 and 42.

Steering of the front wheel suspension system is effected by rotation of the stem shaft 43 with respect to the head pipe 18, and thus the stem shaft 43 comprises the true central steering shaft of the front wheel suspension system.

Recesses 44 and 45 which are depressed radially inwardly are formed on external sides of the head pipe 18, and the pipes 34 and 35 which connect between the first cylinder and the second cylinder or the shock absorber are fitted in the recesses 44 and 45, respectively.

With such piping structure, the pipes 34 and 35 approach the steering center, so that when the front wheel suspension system is pivoted to the right and left with respect to the vehicle body 17, the amount of deflection of the pipes 34 and 35 is decreased.

In the above-described embodiments the present invention is applied as a front wheel suspension system for motorcycles, however, it will be understood that the invention is also applicable as a rear wheel suspension system. More particularly, as shown in FIG. 1, a rear fork 71 is attached to the vehicle body 17 substantially vertically pivotably through a pivot shaft 70. By a pivotal movement of the rear fork 71 with respect to the vehicle body 17 as a stationary member, the movement of a rear wheel 72 in following irregularities in the road surface is effected. Thus, if a cylinder is connected to the rear fork 71 and a pressure medium is fed from the cylinder to a shock absorber, the present invention can also be readily applied as a rear wheel suspension system.

Further, where the wheels of four-wheeled vehicles or like vehicles are constructed so as to move up and down under rocking motion of a rocking member such as a lower fork, the present invention is also applicable for use as a suspension system for the wheels of such four-wheeled vehicles or like vehicles.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:

1. A front wheel suspension system for motorcycles, comprising:
   a vehicle body frame;
   an upper fork supported by said vehicle body frame;
   a lower fork which supports a front wheel;
   links connecting between said upper fork and said lower fork;
   a shock absorber including at least a damper;
   transmission system means for transmitting to said shock absorber a load applied from said front wheel to said lower fork and said links;
   said shock absorber being fixed to said vehicle frame;
   said load transmission system means for said shock absorber including a pressure fluid circuit, and said shock absorber being operated through a fluid pressure;
   said fluid circuit comprising:
      a first fluid pressure cylinder, said first cylinder having a first piston slidably disposed therein and being supported by said upper fork;
      a second fluid pressure cylinder, said second cylinder having a second piston slidably disposed therein and being supported by said vehicle body frame;
      pipe-line means connected between said first cylinder and said second cylinder, the outside end of a piston rod of said first piston being connected at least operatively to said connecting links and the outside end of a piston rod of said second piston being connected to one end of said shock absorber;
      said pipe-line means being disposed between said first cylinder and said second cylinder so that the movement of said first piston upon upward movement of said front wheel causes a compressing action in said shock absorber through an extruding action of said second piston of said second cylinder;
      said first cylinder being pivotably connected at the upper end thereof to an upper portion of said upper fork; and
      the outer end of the piston rod of said first piston is connected to said connecting links through a linkage.

2. A front wheel suspension system for motorcycles according to claim 1, wherein:
   said first cylinder includes first and second chambers defined by said first piston;
   said second cylinder includes third and fourth chambers defined by said second piston;
   said first, second, third and fourth chambers are filled with a non-compressive fluid; and
   said pipe-line means comprises a first pipe communicating between said first chamber of said first cylinder and said third chamber of said second cylinder and a second pipe communicating between said second chamber of said first cylinder and said fourth chamber of said second cylinder.

3. A front wheel suspension system for motorcycles according to claim 1, wherein said first cylinder has a first chamber and a second chamber defined by said first piston, said first and second chambers being filled with a non-compressive pressure fluid and a compressive pressure fluid, respectively, said second cylinder has a third chamber and a fourth chamber defined by said second piston, said third and fourth chambers being filled with a non-compressive pressure fluid and a compressive pressure fluid, respectively, and said pipe-line means comprises a pipe communicating between said first chamber of said first cylinder and said third chamber of said second cylinder.

4. A front wheel suspension system for motorcycles according to claim 1, wherein the connection between the outer end of the piston rod of said second piston and said one end of said shock absorber is effected through a pivotal member pivotably secured to a vehicle body.

5. A front wheel suspension system for motorcycles according to claim 1, wherein:
   said second cylinder is pivotably connected at the upper end thereof to an upper portion of a down tube of said vehicle body frame; and
   said shock absorber is pivotably connected at the lower end thereof to a lower portion of said down tube.

6. A front wheel suspension system for motorcycles according to claim 1, wherein said second cylinder and said shock absorber are disposed along a main frame which extends rearwardly substantially horizontally from a head pipe of said vehicle body frame.

7. A front wheel suspension system for motorcycles according to claim 1, wherein said second cylinder is supported by an upper portion of a down tube of said vehicle body frame, and said shock absorber is disposed along a stiffener frame which extends rearwardly from said down tube at a predetermined angle with repect to said second cylinder.

8. A front wheel suspension system for motorcycles according to claim 1, wherein:
   said second cylinder is disposed along a stiffener frame which extends rearwardly from a down tube of said vehicle body frame; and
   said shock absorber is disposed at a predetermined angle with respect to said second cylinder and the lower end thereof is supported by a rear frame which extends upwardly substantially vertically from the rear end of said down tube.

9. A front wheel suspension system for motorcycles according to claim 1, wherein:
   said linkage comprises a rod connected to a portion of one of said connecting links, and lever means connected between an upper end of said rod and said outer end of said piston rod of said first piston.

10. A front wheel suspension system for motorcycles according to claim 9, wherein:
    said portion of said one of said connecting links comprises an extended tip portion extending beyond a portion of said one connecting link which is connected to said upper fork; and
    said lever means comprises a pair of rocker arms extending in the front and rear and connected respectively to said upper end of said rod and said outer end of said piston rod of said first piston.

11. A front wheel suspension system for motorcycles, comprising:
    a vehicle body frame;
    an upper fork supported by said vehicle body frame;
    a lower fork which supports a front wheel;
    links connecting between said upper fork and said lower fork;
    a shock absorber including at least a damper;

transmission system means for transmitting to said shock absorber a load applied from said front wheel to said lower fork and said links;
said shock absorber being fixed to said vehicle body frame;
said load transmission system means for said shock absorber including a pressure fluid circuit, and said shock absorber being operated through a fluid pressure;
said fluid circuit comprising:
 a first fluid pressure cylinder, said first cylinder having a first piston slidably disposed therein and being supported by said upper fork;
 a second fluid pressure cylinder, said second cylinder having a second piston slidably disposed therein and being supported by said vehicle body frame;
 pipe-line means connected between said first cylinder and said second cylinder, the outside end of a piston rod of said first piston being connected at least operatively to said connecting links and the outside end of a piston rod of said second piston being connected to one end of said shock absorber;
 said pipe-line means being disposed between said first cylinder and said second cylinder so that the movement of said first piston upon upward movement of said front wheel causes a compressing action in said shock absorber through an extruding action of said second piston of said second cylinder;
 said first cylinder having a first chamber and a second chamber defined by said first piston;
 said first and second chambers being filled with a non-compressive pressure fluid and a compressive pressure fluid, respectively;
 said second cylinder having a third chamber and a fourth chamber defined by said second piston. said third and fourth chambers being filled with a non-compressive pressure fluid and a compressive pressure fluid, respectively;
 said pipe-line means comprising a pipe communicating between said first chamber of said first cylinder and said third chamber of said second cylinder; and
 said second chamber of said first cylinder and said fourth chamber of said second cylinder communicating with the outside air, each through valve means.

12. A front wheel suspension system for motorcycles, comprising:
a vehicle body frame;
an upper fork supported by said vehicle body frame;
a lower fork which supports a front wheel;
links connecting between said upper fork and said lower fork;
a shock absorber including at least a damper;
transmission system means for transmitting to said shock absorber a load applied from said front wheel to said lower fork and said links;
said shock absorber being fixed to said vehicle body frame;
said load transmission system means for said shock absorber including a pressure fluid circuit, and said shock absorber being operated through a fluid pressure;
said fluid circuit comprising a first fluid pressure cylinder having a first piston slidably disposed therein and which is supported by said upper fork;
said shock absorber having a second fluid pressure cylinder structure incorporated in a damper thereof, said second fluid pressure cylinder structure having a second piston slidably disposed therein and being supported by said vehicle body frame;
pipe-line means connecting between said first fluid pressure cylinder and said second fluid pressure cylinder structure; and
an outer end of a piston rod of said first piston being operatively connected to said connecting links.

13. A front wheel suspension system for motorcycles according to claim 12, wherein said pipe-line means is disposed between said first cylinder and said second cylinder structure so that the movement of said first piston of said first cylinder causes a compressing action of the damper of said shock absorber.

14. A front wheel suspension system for motorcycles according to claim 13, wherein:
said first cylinder has a first chamber and a second chamber defined by said first piston;
said second cylinder structure of said damper has a third chamber and a fourth chamber defined by said second piston;
said first, second, third and fourth chambers are filled with a non-compressive pressure fluid;
said fourth chamber incorporates therein damping force generating means; and
said pipe-line means comprises one pipe communicating between said first chamber of said first cylinder and said third chamber of said second cylinder structure and another pipe communicating between said second chamber of said first cylinder and said fourth chamber of said second cylinder structure.

15. A front wheel suspension system for motorcycles according to claim 14, wherein said one pipe includes a first passage formed axially in the piston rod of said second piston of said damper.

16. A front wheel suspension system for motorcycles according to claim 14, wherein:
said damping force generating means comprises a block which partitions said fourth chamber into a fifth chamber and a sixth chamber;
said block being formed with a second passage, a third passage, and a fourth passage, said second third and fourth passages being formed in said block so as to communicate between said fifth and sixth chambers;
a first valve member adapted to close said second passage on said sixth chamber side and to be opened by the action of the pressure within said;
a second valve member adapted to close said third passage on said fifth chamber side and to be opened by the action of the pressure within said sixth chamber; and
a third valve member disposed within said fourth passage for controlling the flow rate from said sixth chamber to said fifth chamber.

17. A front wheel suspension system for motorcycles according to claim 10, wherein said third valve member is pivoted with manual operating means for adjusting the flow rate.

18. A front wheel suspension system for motorcycles according to claim 2, 3 or 12, wherein:
said vehicle body frame includes a head pipe, said head pipe having recesses formed on the outer sides thereof; and
said pipes of said pipe-line means are fitted in said recesses formed on the outer sides of said head pipe of said vehicle body frame.

* * * * *